(12) United States Patent
Tanghetti

(10) Patent No.: US 6,481,804 B2
(45) Date of Patent: *Nov. 19, 2002

(54) LIGHT ALLOY RIM WITH A FRONT COVERING ELEMENT IN STAINLESS STEEL AND ITS PRODUCTION METHOD

(75) Inventor: Paolo Tanghetti, Brescia (IT)

(73) Assignee: ATP Ruote In Lega S.p.A. (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/531,901

(22) Filed: Mar. 20, 2000

(65) Prior Publication Data
US 2002/0050735 A1 May 2, 2002

(30) Foreign Application Priority Data

Jul. 20, 1999 (IT) ............................................ BS99A0071
Oct. 14, 1999 (IT) ............................................ BS99A0097

(51) Int. Cl.⁷ .................................................. B60B 7/06
(52) U.S. Cl. ............................... 301/37.36; 301/37.102; 301/37.43
(58) Field of Search ............................ 301/37.1, 37.35, 301/37.36, 37.43, 37.26, 108.1, 108.3, 37.102; 29/894.38, 894.381

(56) References Cited

U.S. PATENT DOCUMENTS

| 1,982,106 A | * | 11/1934 | Hunt ....................... 301/37.24 |
| 2,276,405 A | * | 3/1942 | Lyon |
| 2,304,581 A | * | 12/1942 | Lyon ....................... 301/37.24 |
| 3,481,652 A | * | 12/1969 | Mazzerolle |
| 3,726,566 A | * | 4/1973 | Beith ........................ 301/37.1 |
| 4,040,672 A | * | 8/1977 | Imahashi ................. 301/108.3 |
| 4,530,542 A | * | 7/1985 | Spiegel et al. ............. 301/37.1 |
| 4,720,149 A | * | 1/1988 | Thissen et al. ....... 301/37.24 X |
| 4,943,122 A | * | 7/1990 | Nakamura ............... 301/108.3 |
| 5,112,112 A | * | 5/1992 | Baba ....................... 301/108.3 |
| 5,368,370 A | * | 11/1994 | Beam ...................... 301/37.36 |
| 5,435,631 A | * | 7/1995 | Maloney et al. ......... 301/37.36 |
| 5,595,423 A | * | 1/1997 | Heck et al. .............. 301/37.43 |

FOREIGN PATENT DOCUMENTS

DE 2848790 * 5/1980 ................ 301/37.1

* cited by examiner

Primary Examiner—Russell D. Stormer
(74) Attorney, Agent, or Firm—McGlew and Tuttle, P.C.

(57) ABSTRACT

Tim invention concerns a light alloy rim Im car wheels, consisting of a hub with a center hole and an external border or ring, which ends in a boundary edge. The rim is furnished with a covering element (6, 14) in stainless steel on at least one part of the front surface of the rim, this covering element (6, 14) being fixed in place by mechanically upsetting or chamfering it to at least one part of the rim.

7 Claims, 3 Drawing Sheets

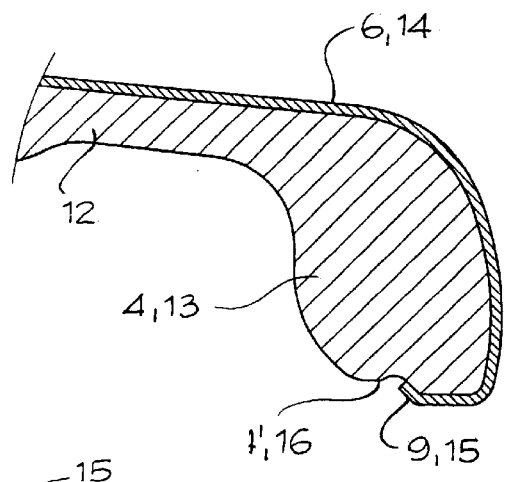
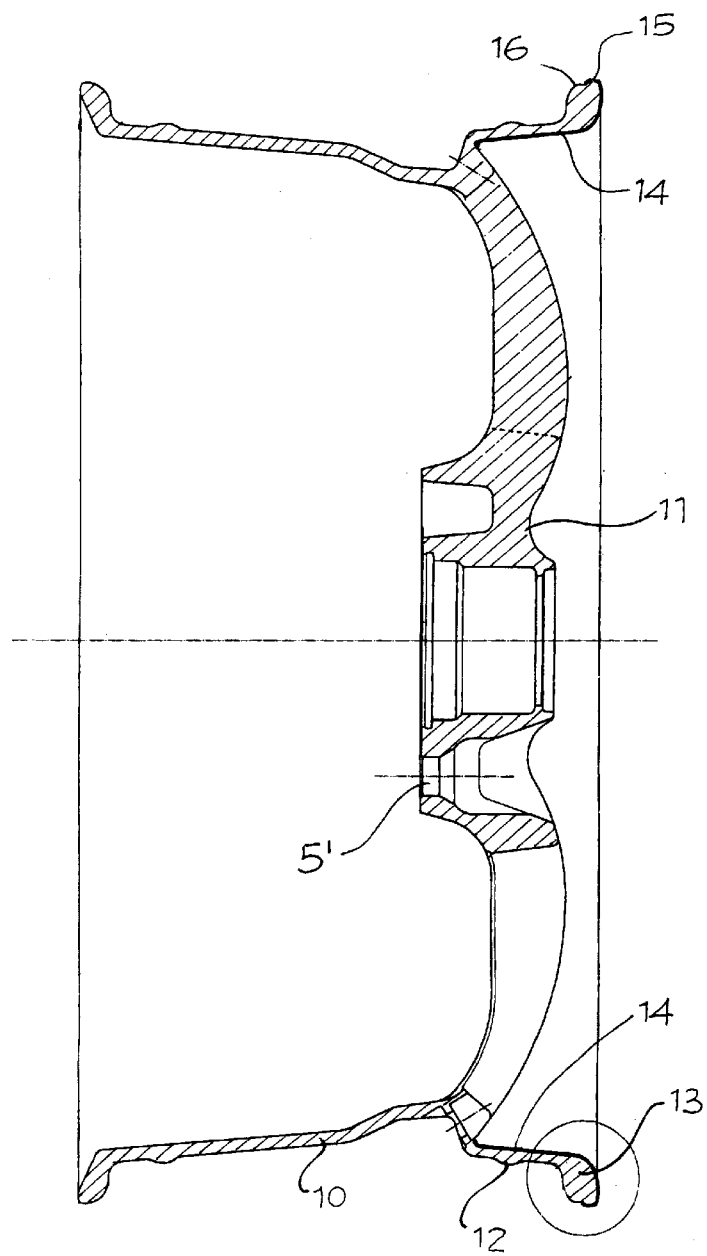

LIGHT ALLOY RIM WITH A FRONT COVERING ELEMENT IN STAINLESS STEEL AND ITS PRODUCTION METHOD

FIELD OF THE INVENTION

This invention concerns the field of light alloy rims for car wheels and, in particular, the covering of at least one visible part, that is, the front, of alight alloy rim with an element in stainless steel in order to increase the value and improve the appearance.

BACKGROUND OF THE INVENTION

There already exist covering elements for light alloy rims for car wheels in a different material, such as stainless steel, These elements are generally limited to the outer area of a rim and are fastened to the rim by means of additional fixtures, which are awkward and liable to work loose, with the risk that the cover will become detached as a result of contact with a pavement or similar, as may easily happen during a parking maneuver.

SUMMARY AND OBJECTS OF THE INVENTION

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

One of the aims of this invention is to propose and produce a light alloy rim equipped with a covering front element in stainless steel, fixed in place with an innovative mechanical means, without the use of glue or other additional means, but, nevertheless, held there permanently and securely.

Another purpose of this invention is to supply a light alloy rim with a covering element that covers the whole front part, from the outer edge to the centre hub.

A further aim of the invention is to supply a light alloy rim with a circular covering element that covers, an outer ring of the rim itself.

These aims are achieved by applying a covering element in stainless steel to at least one part of the front surface of a rim, folding at least an outer part of the covering element over an outer external edge of the rim and folding down, by means of upsetting or chamfering, the outer margin of the covering element behind a circular undercut, located around the outer external edge.

The covering element may extend from the outer edge as far as the centre hub of the rim, or be restricted to the most external border or ring of the front of the wheel. In any case, the external seaming line of the element is hidden, invisible from the front of the rim.

BRIEF DESCRIPTION OF THE DRAWINGS

The enclosed drawings illustrate examples of the light alloy rim with a covering element applied, in accordance with the invention. In said drawings:

FIG. 2 shows a similar section of alight alloy rim with a covering only on the external border or ring;

FIG. 4 also shows a cross-section of an enlarged detail of the part of the rim border circled in FIGS. 1 and 2.

DESCRIPTION OF THE PREFERRED EMBODIMENT

Figure 1:
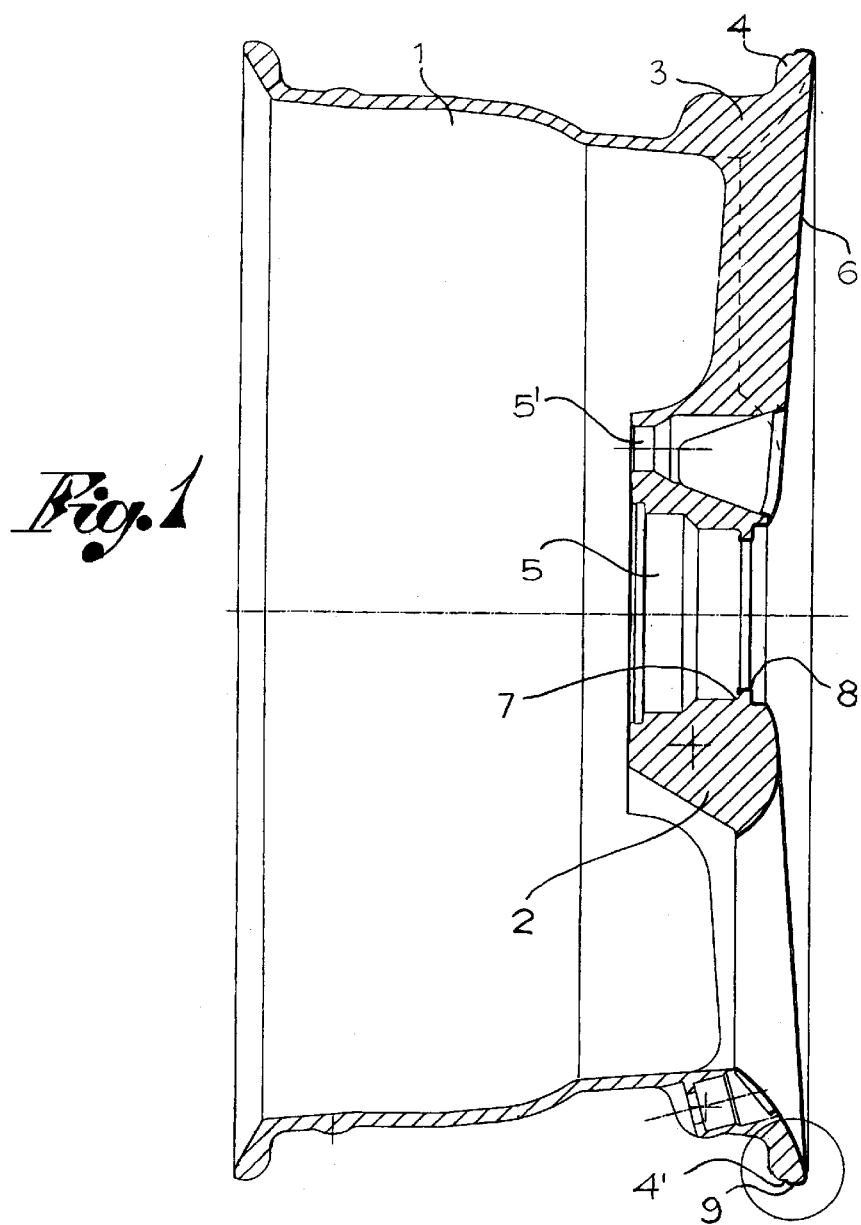
FIG. 1 shows a cross-section of alight alloy rim with a complete front covering.

Referring to the drawings in particular, the light alloy rim 1 to which this invention can be applied is of the conventional type, with spokes and holes of any aesthetic shape around a central hub 2 and with an external border or outer ring 3 which projects frontally and ends in an outer edge 4. The hub connection will have a centre hole 5 and holes 5' for the fixing screws that hold the rim on the car wheel support.

Figure 3:
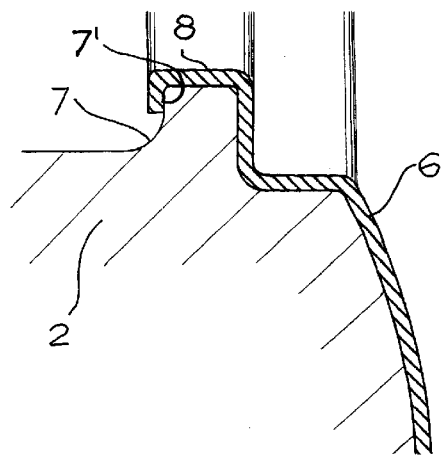
FIG. 3 shows, in cross-section, an enlarged detail of the covering in FIG. 2, in correspondence with the centre hole in the rim hub.

The rim may be completely covered in the front part FIGS. 1–3. In this case, a sheet of stainless steel 6 will be needed, suitably shaped in such a way as to match the visible front surface of the rim, covering it completely. The sheet will also have folded-back parts which will interact with the corresponding parts on the rim.

In detail and referring to FIG. 3, the centre hole 5 in the hub has a circular protuberance 7 that defines an undercut 7' or first connection undercut which interlocks with a turn-up or chamfered margin 8 forming a seaming line on the internal edge of the steel sheet 6.

Similarly, with reference to FIG. 4, the outer external edge 4 of the rim has an undercut 4', or second connection undercut, to which is hooked an external turn-up or chamfered margin 9 of the steel sheet 6 and forms a seaming line.

In this way, the stainless steel sheet 5 is completely and securely fastened to the rim 1, totally covering it.

In accordance with the invention, the rim 11 may also be only partially covered in front with a stainless steel element, as shown in FIG. 2, at the level of the visible surface of the edge or ring 12. In such a case, this edge or ring surface 12 is finished and covered with a circular strip 14 in stainless steel, extending over the outer edge 13 and fastened to it. The external or chamfered margin 15 of the strip 14 is folded behind an undercut 16, made around the edge 13. Said undercut 16 may consist of a rim gutter, as shown in the drawing—FIGS. 2 and 4—or by a shoulder or step, turned over towards the rear of the edge.

Figure 5:
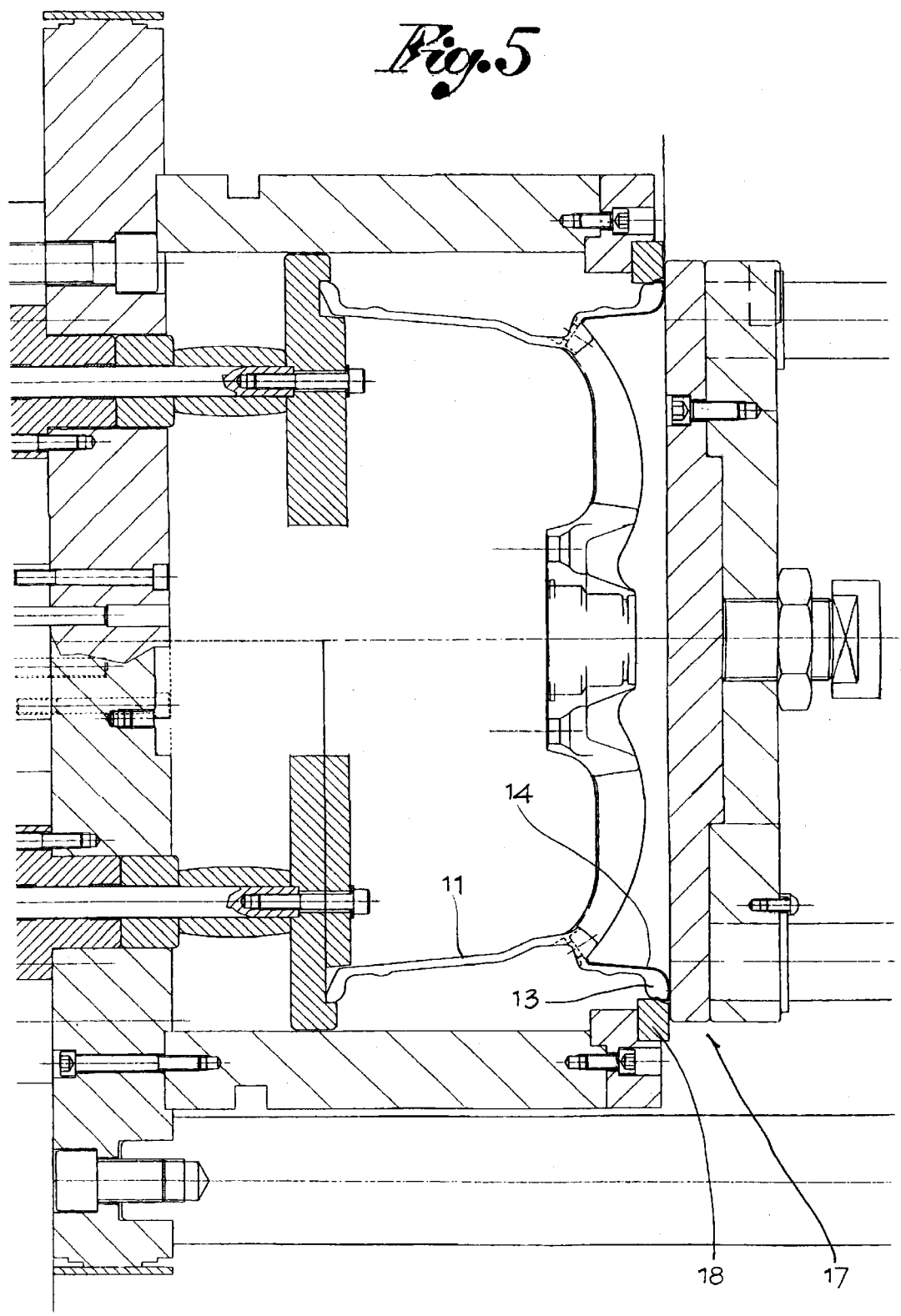
FIG. 5 shows an example of the equipment for applying the covering element to the rim border.

The covering strip 14 may be applied to the rim with a piece of equipment 17, such as that shown in FIG. 5, for example. This equipment consists of various functional devices 17, 18, designed to hold the circular strip 14 to the internal surface of the edge or ring 12 of the rim, to turn up an outer part of the strip so that it grips the outer edge 13 and to fold over, by either the mechanical means of upsetting or chamfering, the external margin of the strip 14 behind the undercut 16, that is, into the rim gutter around the edge.

As a result, the covering strip in stainless steel will be tightly and securely fastened to the rim, covering the surfaces in question. The upset or chamfered margin 15, acting with the undercut or rim gutter, guarantees the solidity and stability required for the covering strip, producing the desired effect.

While specific embodiments of the invention have been shown and described in detail to illustrate the application of the principles of the invention, it will be understood that the invention may be embodied otherwise without departing from such principles.

What is claimed is:

1. A rim construction, comprising, a rim body having an outer ring, a central hub and a connection between the hub and said outer ring defining an exposed front wheel surface, said rim having a non-adhesive first connection undercut and a non-adhesive second connection udercut between said first connection undercut and a center of said center hub;

a stainless steel covering element having a chamfered margin and a tun-up element, said first connection undercut of said rim enaging said chamfered margin of said covering element to lock said covering element to said ring of said rim, said second connection undercut of said rim engaging a turn-up element of said covering element wherein said covering element overlays part of said front wheel surface of said rim said covering element being in contact with said undercut connections, wherein said covering element performs at least one directional change in a direction from said front wheel surface such that an edge of said covering element extends over said front wheel surface while engaging at least one of said connection undercuts of said rim body to exclusively mechanically connect said covering element to said rim body.

2. The rim construction according claim 1, wherein said chamfered margin engages said first connection undercut of said rim thereby securing said covering element to said rim.

3. The rim construction according claim 1, wherein said chamfered margin engages said second connection undercut of said rim thereby securing said covering element to said rim.

4. The rim construction according claim 1, wherein said chamfered margin engages said first connection undercut of said rim and engages said second connection undercut of said rim thereby securing said covering element to said rim.

5. The rim construction according claim 1, wherein said undercut is a rim gutter.

6. The rim construction according claim 1, wherein said stainless steel covering element extends over entire said front surface of said rim.

7. The rim construction according claim 1, further comprising a seaming line between an edge of said covering element and said rim body, said seaming line being positioned to at least one of said connections undercut whereby said seaming line is concealed from a view of said front surface of said rim.

* * * * *